United States Patent [19]

Lightfoot

[11] 4,003,366
[45] Jan. 18, 1977

[54] SOLAR HEAT COLLECTOR MODULE

[76] Inventor: Daniel J. Lightfoot, 415 N. Main St., Sigourney, Iowa 52591

[22] Filed: Dec. 11, 1975

[21] Appl. No.: 639,847

[52] U.S. Cl. .............................. 126/271; 237/1 A; 350/293

[51] Int. Cl.² ........................................ F24J 3/02

[58] Field of Search .......... 126/270, 271; 237/1 A; 60/641; 350/288, 289, 293, 294

[56] References Cited

UNITED STATES PATENTS

| 842,658 | 1/1907 | Haskell | 126/270 |
| 1,014,972 | 1/1912 | Nichols | 126/271 |
| 2,859,745 | 11/1958 | Brudersdorff | 126/270 |
| 3,321,012 | 5/1967 | Hervey | 126/271 |
| 3,866,285 | 2/1975 | Clark | 126/271 |
| 3,923,039 | 12/1975 | Falbel | 126/271 |

FOREIGN PATENTS OR APPLICATIONS

| 252,708 | 4/1962 | Australia | 126/270 |

Primary Examiner—Kenneth W. Sprague
Assistant Examiner—James C. Yeung
Attorney, Agent, or Firm—Rudolph L. Lowell

[57] ABSTRACT

A solar heat system is comprised of a panel or bank of heat collector modules each of which has a fluid-carrying tube of an elongated triangular shape in transverse cross section formed with longitudinally extended inwardly projected heat radiating fins. A tube is mounted within a concavo-convex reflector of a hyperbolic form such that the side walls of the tube are subjected to reflected rays of solar radiation over an effective range of solar exposure of about one hundred and fifty (150°) degrees. The reflected rays are concentrated in a longitudinally extended focal zone on each side wall of the tube and these zones of concentrated solar radiation move transversely of a side wall in response to the angle of the solar rays falling upon the reflector.

6 Claims, 10 Drawing Figures

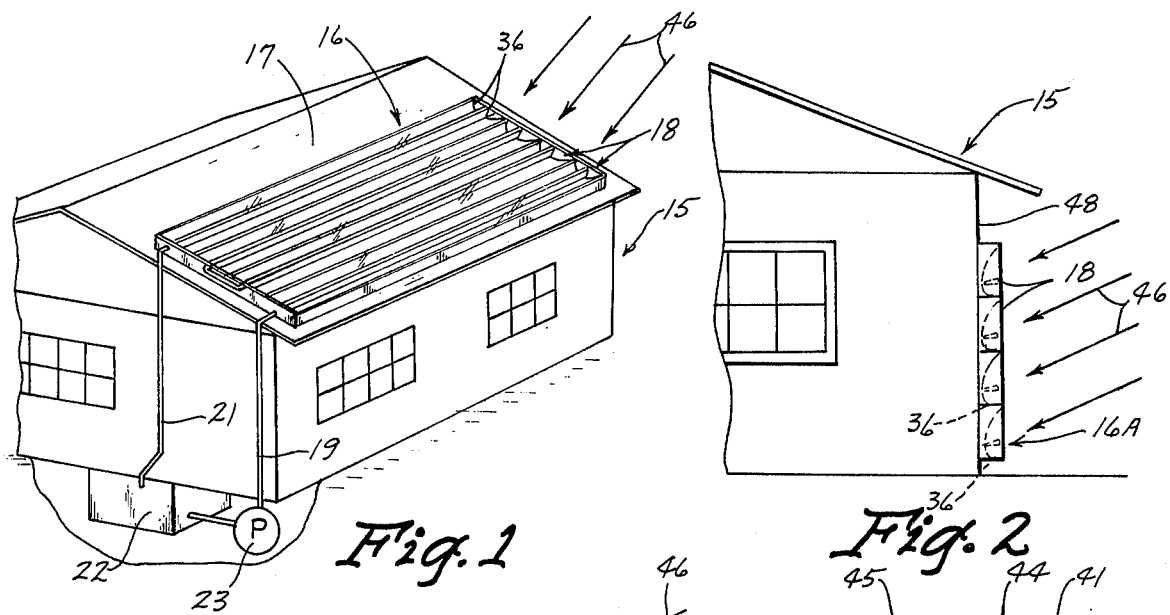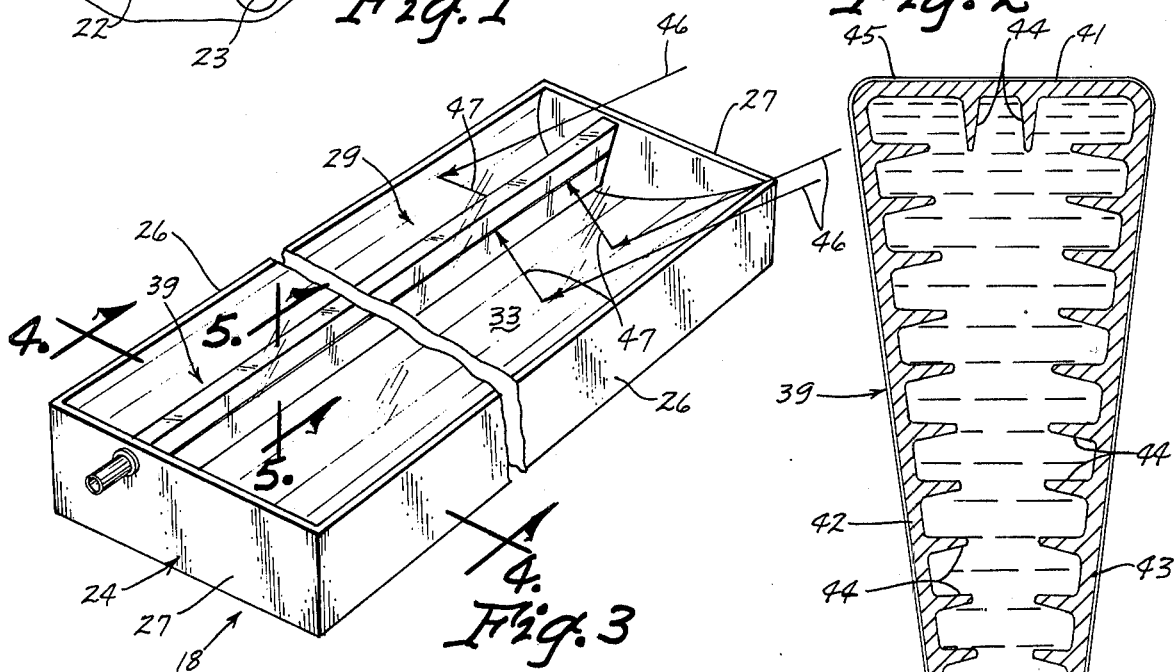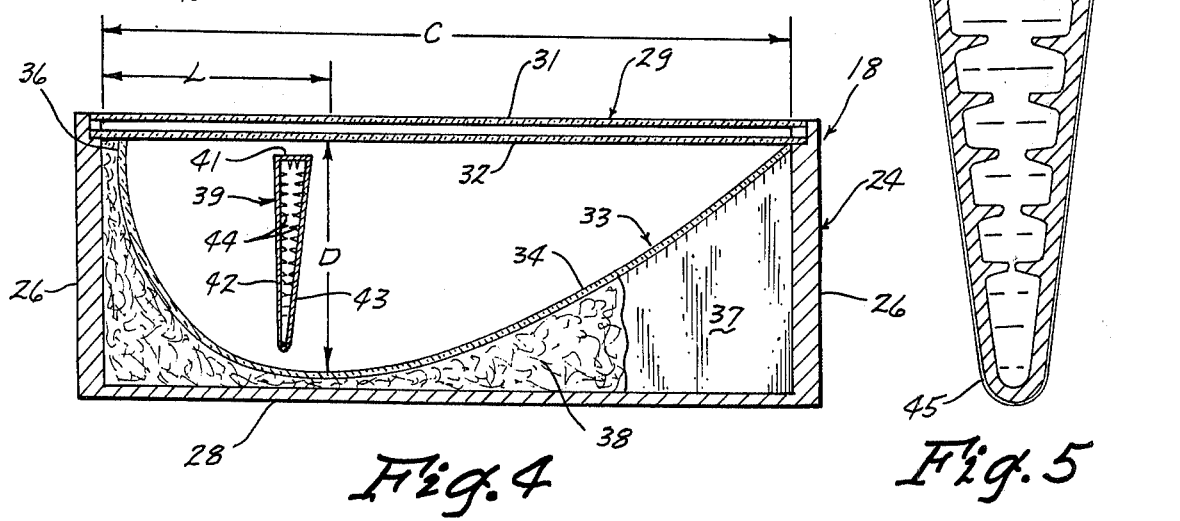

SOLAR HEAT COLLECTOR MODULE

SUMMARY OF THE INVENTION

The relative arrangement and construction of the reflector and fluid-carrying tube in the heat collector module of this invention provides for an extremely efficient collection of solar radiations which efficiency takes place over a wide angle of solar exposure without requiring the use of tracking devices to maintain a predetermined relation between the sun and the reflector. The fluid-carrying tube is continuously subjected to reflected solar rays, the radiated heat from which is concentrated in focal zones extended longitudinally on each side wall of the tube. By virtue of the inwardly projected heat radiating fins in the tube, the radiant heat collected by the tube is efficiently transferred to the heat conducting fluid in the tube for delivery into a room heating system or the like.

BRIEF DESCRIPTION OF THE DRAWINGS

FIG. 1 is a perspective view of a house showing a solar heat system in assembly relation therewith;

FIG. 2 is a partial side elevation of a house showing a modified assembly of the solar heat system therewith;

FIG. 3 is a foreshortened perspective view of the heat collector module of this invention which forms part of the solar heat system shown in FIGS. 1 and 2;

FIG. 4 is an enlarged sectional view of the heat collector module as seen along line 4—4 in FIG. 3;

FIG. 5 is an enlarged cross-sectional view of the fluid carrying tube taken on line 5—5 in FIG. 3;

DETAILED DESCRIPTION OF THE INVENTION

Figure 6:
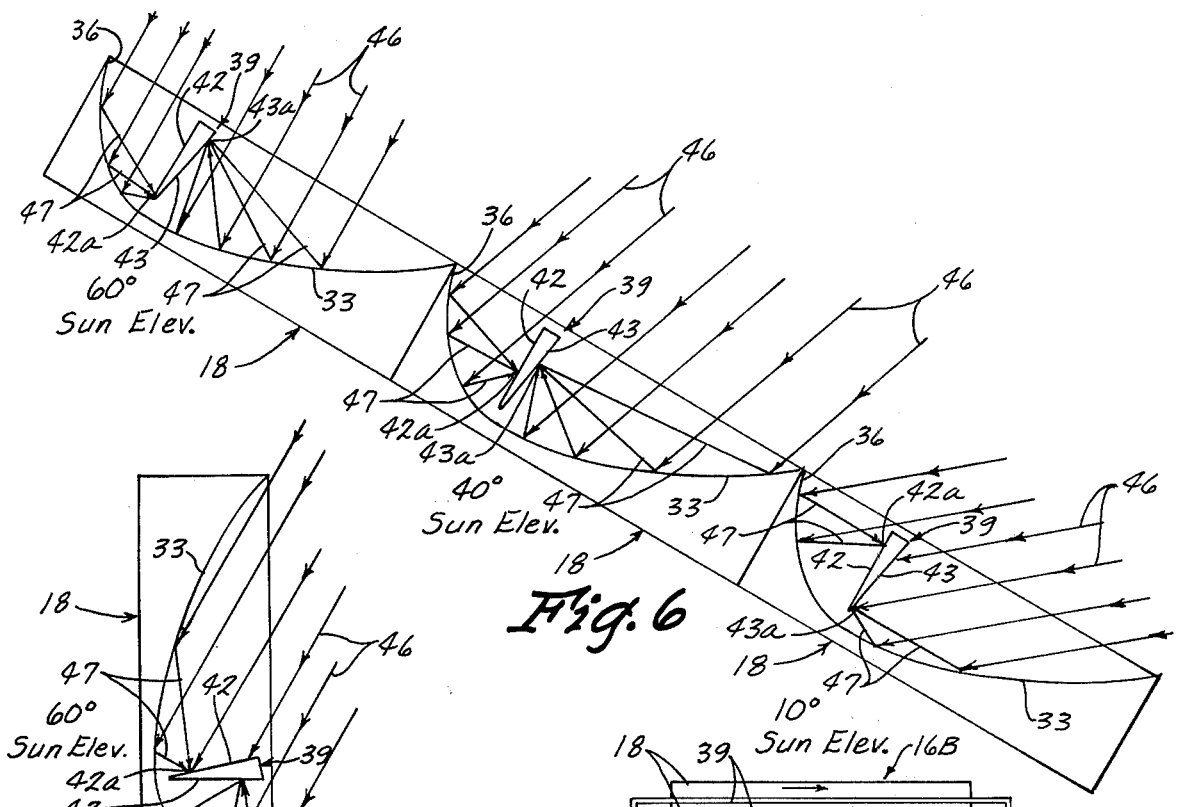
FIG. 6 is a reflected heat diagram for the solar heat panel shown in FIG. 1.

With reference to FIG. 1, there is shown a solar heating system for a house 15, which includes a solar heat panel 16 mounted on the southern slope 17 of the house and including a plurality of heat collector modular units 18 of this invention. The modules 18 are illustrated as connected in series with an inlet pipe 19 and outlet pipe 21 connected to a hot water tank or thermal energy storage system 22. A pump 23 in the inlet pipe 19 provides for a circulation of a heat transfer fluid, such as water or anti-freeze liquid, from the tank 22 for successive travel through the modules 18 and return to the tank through the outlet pipe 21. The tank functions to store collected energy for use in a house heating system (not shown) during the night and heavily overcast day periods. Any number of modules may be used in a solar heat panel for connection in parallel, in series or in series-parallel to provide a desired heating condition.

Each heat collector module 18 (FIGS. 3 and 4) includes a housing 24 of an elongated box shape having side walls 26, end walls 27, and a bottom wall 28 of a metal or fiber glass construction; and a transparent top cover or wall 29. The top wall is of a double pane construction that includes an upper pane 31 made of Tedlar, a DuPont polyvinyl flouride plastic film having a thickness of about four mils., arranged in parallel spaced relation with a fiber glass transparent lower pane 32 about .040 inches in thickness known as Sun-Lite and available from the Kalwall Corporation of Manchester, New Hampshire. Tedlar is known for its ability to withstand the elements and has the characteristic of selectively transmitting only the short wave frequences of light and of being opaque to long wave infra red. The top wall 29 thus functions to prevent re-radiation of solar rays into the atmosphere.

Mounted within and extended longitudinally of the housing 24 is a reflector 33 of a concavo-convex shape in transverse cross section, the concave surface 34 of which faces upwardly toward the top wall 29. The reflector 33 may be constructed of either reflectorized sheet aluminum or stainless steel and has a curvature which follows generally the shape of a section of a hyperbolic spiral. The lower pane 32 lies in the plane of a chord that extends between the extremities of the arc formed by the reflector. Thus, as shown in FIG. 4, the maximum lateral dimension or depth D of the reflector 33 occurs in a plane normal to the chord, and located inwardly from the arc extremity 36 a distance equal to about one-third the length of the chord, as indicated by the letter L.

The shape of the arc is maintained by its support on transverse form retaining members 37 mounted within and spaced longitudinally of the housing 24. A suitable thermal insulation 38 is filled in between the form retaining members to thermally insulate the convex or bottom surface of the reflector 33 against the conduction or radiation of heat toward the side and bottom walls of the housing.

In one embodiment of the invention, the housing 24 is 7 inches high, 20 inches wide and about 8 feet long; the reflector 33 has a developed rectangular shape of about 2 feet by 8 feet and a chord length C (FIG. 4) between the arc extremities of the reflector of about 19 inches; and the panes 31 and 32 of the top wall 29 are rectangular in shape and spaced about one-half of an inch apart.

In this embodiment, the maximum depth or lateral dimension D is about 6¼ inches at a distance L from the arc extremity 36 of about 6 inches. At a distance of about 3 inches from the extremity 36 the lateral depth of the reflector arc is about 5¼ inches and at distances of about 10 and 14 inches from the arc extremity 36 the lateral arc depths are about 5½ inches and 3⅝ inches, respectively.

Mounted within and extended longitudinally of the reflector 33 is a fluid carrying or heat collector tube 39 of an elongated triangular shape in transverse cross section (FIGS. 4 and 5) having a base or top wall 41 and side walls 42 and 43 of substantially equal length. In the above mentioned embodiment of the invention the base wall is about 2 inches wide and the side walls 42 and 43 are about 6 inches wide. The collector tube 39 has the base wall 41 spaced from the housing top wall 29 with the side wall 42 thereof adjacent to and substantially parallel with the plane at the maximum lateral depth D of the reflector arc. The collector tube is made of aluminum and formed by extrusion with spaced heat radiating fins 44 extended longitudinally of the tube and projected inwardly from the inner surfaces of the tube walls 41, 42 and 43. The outer surface of the tube 39 is painted or coated with a black colored heat absorbing material, indicated at 45 in FIG. 5, such as Nextel, available from the 3M Company of Minneapolis, Minn. This Nextel material has a capacity of absorbing about ninety-eight percent of the heat directed or reflected thereon. Where desired a selective coating for the heat collector tube 39 may be used.

In the solar heat system for the house installation shown in FIG. 1, the roof 14 is illustrated with a pitch of about 30° and the panel 16 as comprised of four of the modules 18. The modules are in a series-connection extended longitudinally in an east-west direction on the south roof 17 of the house 15, with the arc extremity 36 uppermost. The reflected heat diagram of this installation is shown in FIG. 6 for sun elevations from the horizon of 10°, 40° and 60°. At the ten degree sun elevation, and wherein direct sun rays are indicated at 46 and reflected rays at 47, it is seen that the reflected rays 47 meet or concentrate at a focal zone 43a which extends longitudinally over the full length of the collector tube wall 43 at a position adjacent its lower end. This focal zone 43a, in the previously referred to invention embodiment, is about one-half inch wide and constitutes a reflected heating surface. At the same time there is formed adjacent the upper end of the wall 42 a focal zone 42a. This concentration of collected solar heat at opposite ends of the collector tube 39 is quickly and efficiently transferred to the heat conducting medium flowing through the tube by the heat radiating fins 44.

During elevation of the sun from 10° to 40°, the focal zone 43a progressively moves upwardly on the tube wall 43 concurrently with a progressive downward movement of the focal zone 42a on the side wall 42 (FIG. 6) such that the heated surfaces or zones 42a and 43a are intermediate the ends of the collector tube. As the elevation of the sun continues, from 40° to 60°, the focal zone 43a moves progressively to a position adjacent the upper end of the tube wall 43 concurrently with the progressive movement of the focal zone 42a to a position adjacent the lower end of the tube wall 42.

It is seen, therefore, that for a 60° elevation of the sun, the focal zones 42a and 43a are in diagonally reversed positions on the tube 39 relative to the positions therefor when the sun is at a 10° elevation. Thus, for a sun exposure from a 10° elevation to a 60° elevation, the side walls 42 and 43 of the collector tube 39 may be completely traversed by their associated focal zones 42a and 43a, respectively. Importantly, for a sun exposure of about 150°, focal zones 42a and 43a are continuously formed on the tube side walls 42 and 43, respectively. This continuous concentration of solar heat rays on the collector tube 39 takes place with a fixed orientation of the modules 18 relative to the sun's movement across the sky. As a result, tracking mechanism for maintaining a predetermined orientation or relation of a heat collector module with the sun is completely eliminated.

Figure 7:
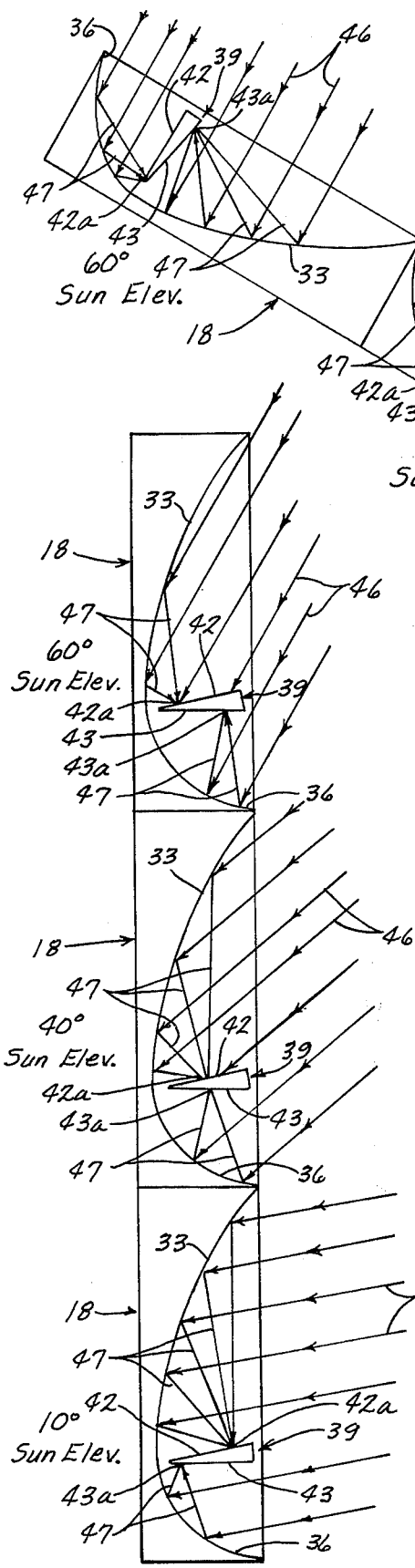
FIG. 7 is a reflected heat diagram for the solar heat panel shown in FIG. 2.

In the solar heat system for the house installation, shown in FIG. 2, the modules 18, shown as four in number for the panel 16A, are extended longitudinally in an east-west direction rigidly secured to an upright south wall 48 of the house 15 with the arc extremities 36 lowermost. With reference to the reflected heat diagram shown in FIG. 7, corresponding to the FIG. 2, installation, it is seen that the direct and reflected solar rays 46 and 47, respectively, provide for the traverse of the focal zones 42a and 43a on the tube side walls 42 and 43, respectively, in all ways similar to such traverse as previously described in connection with FIG. 6.

Figure 8:
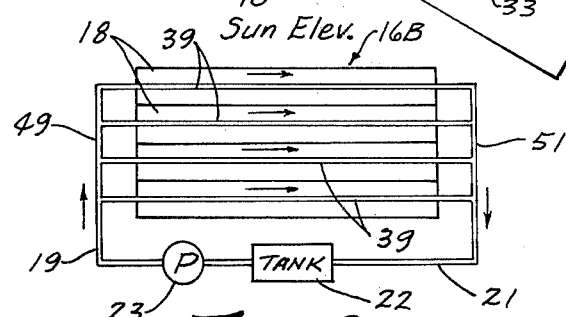
FIG. 8 is a diagrammatic showing of a solar heat panel wherein the heat collector modules are connected together in a parallel arrangement.
Figure 9:
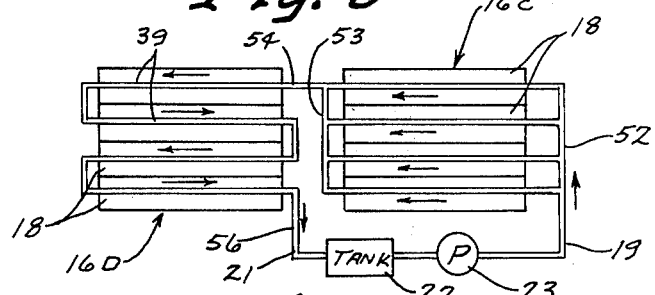
FIG. 9 is a diagrammatic showing of a pair of solar heat panels wherein the heat collector modules are connected together in a series-parallel relation.
Figure 10:
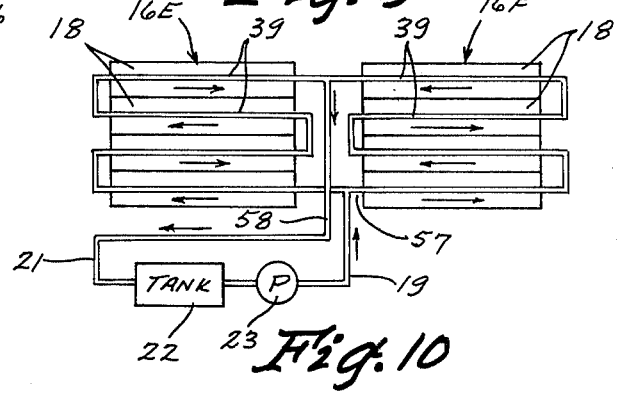
FIG. 10 is a diagrammatic showing of a pair of solar heat panels wherein the heat collector modules are connected together in a series relation.

FIG. 8 illustrates the connection of the modules 18 in parallel in a panel 16B with the collector tubes 39 connected to a common inlet header 49 and their discharge ends to a common outlet header 51. In this type installation there is provided a moderate or warm outlet temperature of the fluid in the outlet pipe 21.

Where a preheating of the water is desired to obtain an outlet temperature of higher temperature than is provided for in the parallel connection of FIG. 8, the modules 18 are connectible in a parallel-series arrangement as shown in FIG. 9 with the modules 18 in the panel 16C connected in parallel and the modules in the panel 16D in series. Water supplied from the tank 22 to the inlet header 52 of panel 16C is preheated within the panel prior to its flow from the outlet header 53 into the inlet 54 of the series connected modules in the panel 16D. The temperature of the fluid at the outlet 56 of the panel 16D will thus be higher than the temperature obtained in the header 51 of the FIG. 8 assembly due to the preheating effected by the parallel connection of the modules 18 in the panel 16C.

Where water at a high temperature is desired, the modules 18 are connectible in series in a pair of panels 16E and 16F, as shown in FIG. 10. In this assembly it is seen that each panel 16E and 16F has an inlet 57 connected to the panel inlet line 19 from the pump 23 and an outlet 58 connected to the panel outlet pipe 21 to the water storage tank 22.

When a solar heat collector is to be used to heat air for use in a house heating system, a grain drying system or the like, it is only necessary to relatively increase the size of the collector tube 39 and reflector 33 of a module 18 to provide for a low pressure air flow in the tube 39. In this instance a hot air thermal energy absorbing system would be substituted for the tank 22.

Although the invention has been described with respect to a preferred embodiment thereof, it is to be understood that it is not to be so limited since changes and modifications can be made therein which are within the full intended scope of this invention as defined by the appended claims.

I claim:
1. A fixed position concentrating solar heat collector module for radiantly absorbing solar heat including:
  a. an elongated housing having a transparent top wall,
  b. a reflector of a concavo-convex hyperbolic shape having a concave reflecting surface,
  c. said reflector positioned within and extended longitudinally of said housing with the concave reflecting surface thereof faced upwardly,
  d. means in said housing for thermally insulating the convex surface of said reflector, and
  e. a heat collector tube of an elongated triangular shape in transverse cross section longitudinally mounted within the lateral confines of the arc of said reflector having a base wall thereof positioned upwardly and one side wall thereof arranged substantially perpendicular to a chord extended between the extremities of the arc of said reflector and having a vertical dimension substantially equal to the maximum lateral dimension of the reflector.
2. The fixed position concentrating solar heat collector module according to claim 1, wherein:

a. said maximum lateral dimension of the reflector is in a plane extended longitudinally of the reflector and perpendicular to and intersecting said chord about one-third the length thereof from one of said arc extremities, and
  b. said heat collector tube is located substantially within the confines of said one-third length of the chord with said one side wall thereof opposite said one arc extremity.

3. The solar heat collector module according to claim 2, wherein:
  a. the linearly extended width of said reflector is about one-third longer than the length of said chord.

4. The solar heat collector module according to claim 1, wherein:
  a. said heat collector tube has the side walls thereof about equal in width and the base wall of a width equal to about one-third of the width of a side wall.

5. The solar heat collector module according to claim 1, wherein:
  a. the portions of said reflecting surface at opposite sides of the heat collector tube reflect solar rays therefrom to a single focal zone linearly extended longitudinally of and over substantially the full length of an adjacent side wall of said tube.

6. The solar heat collector module according to claim 5, wherein:
  a. the focal zones on said side walls move laterally of said walls in opposite directions in response to the travel of the sun across the sky.

* * * * *